Oct. 15, 1957 K. M. NICOLSON ET AL 2,809,435
APPARATUS FOR MAINTAINING PROPER DEPTH
CORRELATION IN WELL LOGGING APPARATUS
Filed Dec. 19, 1955 2 Sheets-Sheet 1

INVENTOR
KINGSLEY M. NICOLSON
BY
ATTORNEYS

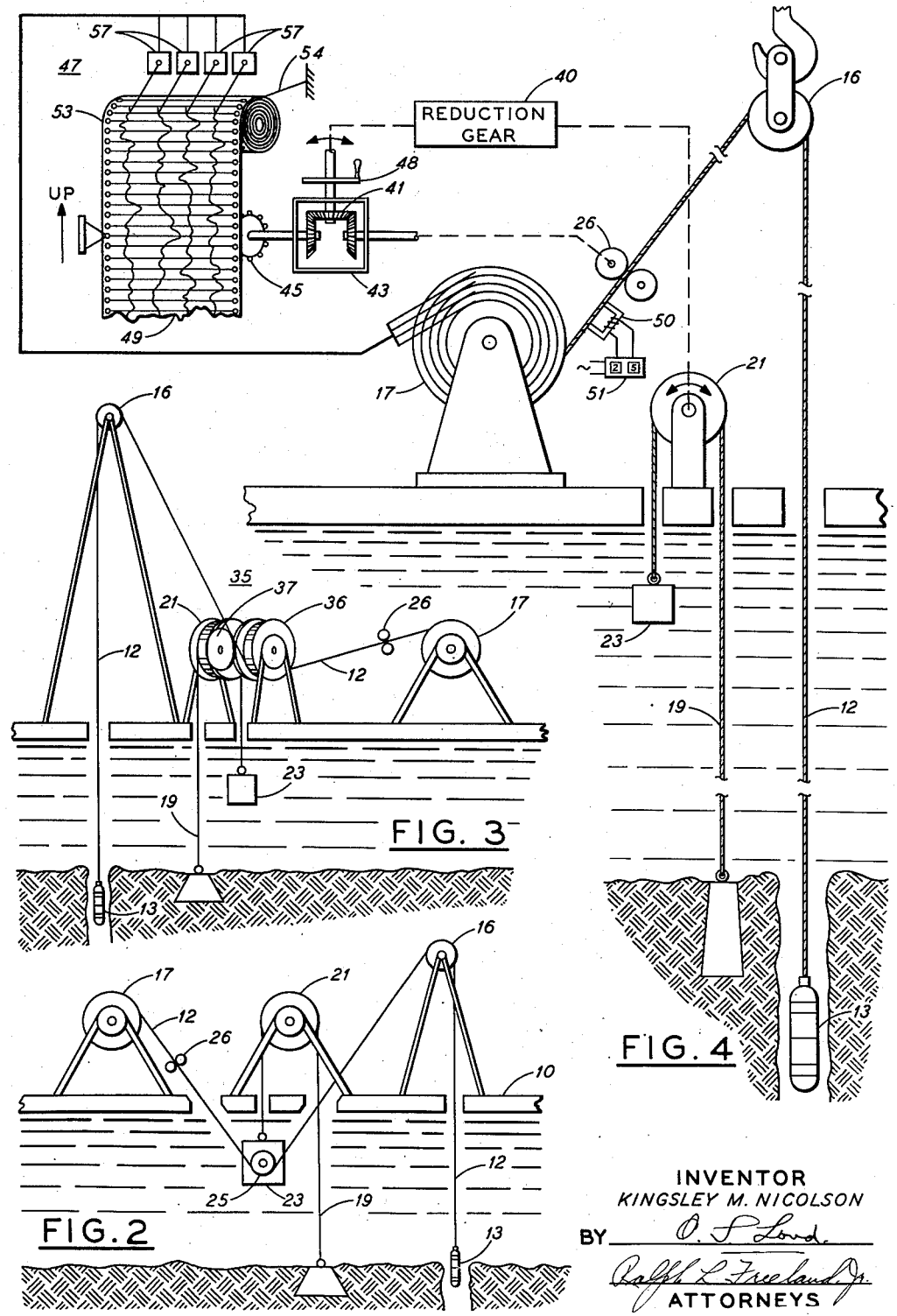

United States Patent Office 2,809,435
Patented Oct. 15, 1957

2,809,435

APPARATUS FOR MAINTAINING PROPER DEPTH CORRELATION IN WELL LOGGING APPARATUS

Kingsley M. Nicolson, Fullerton, and Albert E. Worthington, Laguna Beach, Calif., assignors to California Research Corporation, San Francisco, Calif., a corporation of Delaware Application December 19, 1955, Serial No. 553,978

8 Claims. (Cl. 33—134)

The present invention relates to recording systems for well logging apparatus and more particularly to apparatus for obtaining a recorded log which indicates directly the proper depth measurement, while the well logging instruments within the well bore, or logging sonde, and cable are supported from an unstable structure, such as a floating vessel subjected to vertical wave motion.

It is an object of the present invention to provide a system for accurately recording the depth of a well logging sonde in a bore hole when supported from a floating drill structure. As used herein, the word "sonde" means the container of instruments for detecting characteristics of subterranean strata which is lowered into a well bore in pursuance of a well logging operation. Types of sondes can be seen in the "Composite Catalog of Oil Field and Pipeline Equipment," published by World Oil, 3301 Buffalo Drive, Houston 19, Texas, 19th 1952–53 edition, vol. 2 at pages 4559 et seq.; 20th 1954–55 edition, vol. 2 at page 4460. In such a system the cable supporting the logging sonde normally moves vertically up and down to the same extent as does the freely floating support. In a preferred form of apparatus for carrying out the present invention, a compensating system responsive to the vertical movement of the support is interposed between that portion of the logging cable entering the well bore and that portion of the well logging cable fixed to the floating structure. Said compensating structure varies the length of the logging cable in accordance with the vertical displacement of the ship or support relative to the underwater bottom by measuring said vertical motion and then applying a corrective motion to the logging cable in an amount to maintain the logging cable and sonde substantially stationary in depth.

In the drilling of well bores for coring or actual petroleum exploration from a floating drill structure, it has been found difficult to interpret the electric and resistivity logs, or other logs recording a physical measurement along a depth scale, when the logging cable is supported from the drill derrick or mast, as in dry land or fixed platform operations. In particular, when the drilling has been done from a vessel or boat, the normal vertical movement may be of the order of 2–5 feet under conditions where E-logs are run. Such vertical variations in height occur cyclically at a rate of about 3 to 10 cycles per minute. This movement represents a relatively large vertical change in the recorded depth, even where the vertical logging speed is of the order of 20 ft. per second. Thus, the indicated footage markers on the recorded log do not represent actual depth, since the logging sonde continuously oscillates, and therefore accelerates and decelerates, as it is withdrawn from the well bore.

In accordance with the present invention, a system is provided for automatically compensating for the vertical movement of the logging sonde and cable that includes a depth-sensing system comprising measuring cable means extending from a fixed anchor on bottom over a pulley with the opposite, or free end, of said cable being maintained taut by a weight member movable up and down with the rise and fall of the floating platform. In accordance with the invention, the indicated depth of the logging cable is continuously adjusted in response to this measured vertical motion, as detected by said pulley and weight arrangement.

In a preferred form of apparatus, the unreeled portion of the logging cable passes over a compensating pulley supported by the traveling weight member, so that as the ship rises and falls in the water a compensating length of logging cable extends and retracts over the main supporting pulley for the logging cable. The logging sonde and cable are maintained in a relatively fixed position in the well bore by each retraction being made substantially equal to the downward movement of the ship and each extension equal to each rise in the ship's position. Thus, the logging cable may be raised at a uniform rate, and the measurement of the depth of said cable made by measurement of the amount of cable unwound from the supply drum substantially independent of the ship's motion.

In an alternative form of the present invention the depth-sensing system responds to the vertical motion of the supporting platform as detected by rotation of the supporting pulley for the depth-sensing or measuring cable. In said arrangement the rotational motion of the pulley is utilized either to release directly an additional length of cable when the ship is rising in the water, or retract a compensating amount of cable as the ship falls. Alternatively, the rotational motion of the position-sensing system is used to adjust in a compensatory direction the paper upon which the depth log is recorded.

Further objects and advantages of the present invention will become apparent in the following detailed description, taken in conjunction with the accompanying drawings, which form an integral part of the present specifications.

In the drawings:

Fig. 2 is a schematic representation illustrating in greater detail the vertical motion compensating system utilized in the arrangement of Fig. 1.

Fig. 3 is an alternative arrangement for compensating vertical motion of the logging cable, similar to the system of Fig. 2, but particularly illustrating the method of using rotational motion of the position-measuring pulley for such compensation.

Fig. 4 is a further alternative similar to the arrangement in Fig. 3, in which vertical movement of the floating platform is compensated by movement of the record paper in a direction to record the true position of the logging cable and sonde in the well bore.

Figure 1:
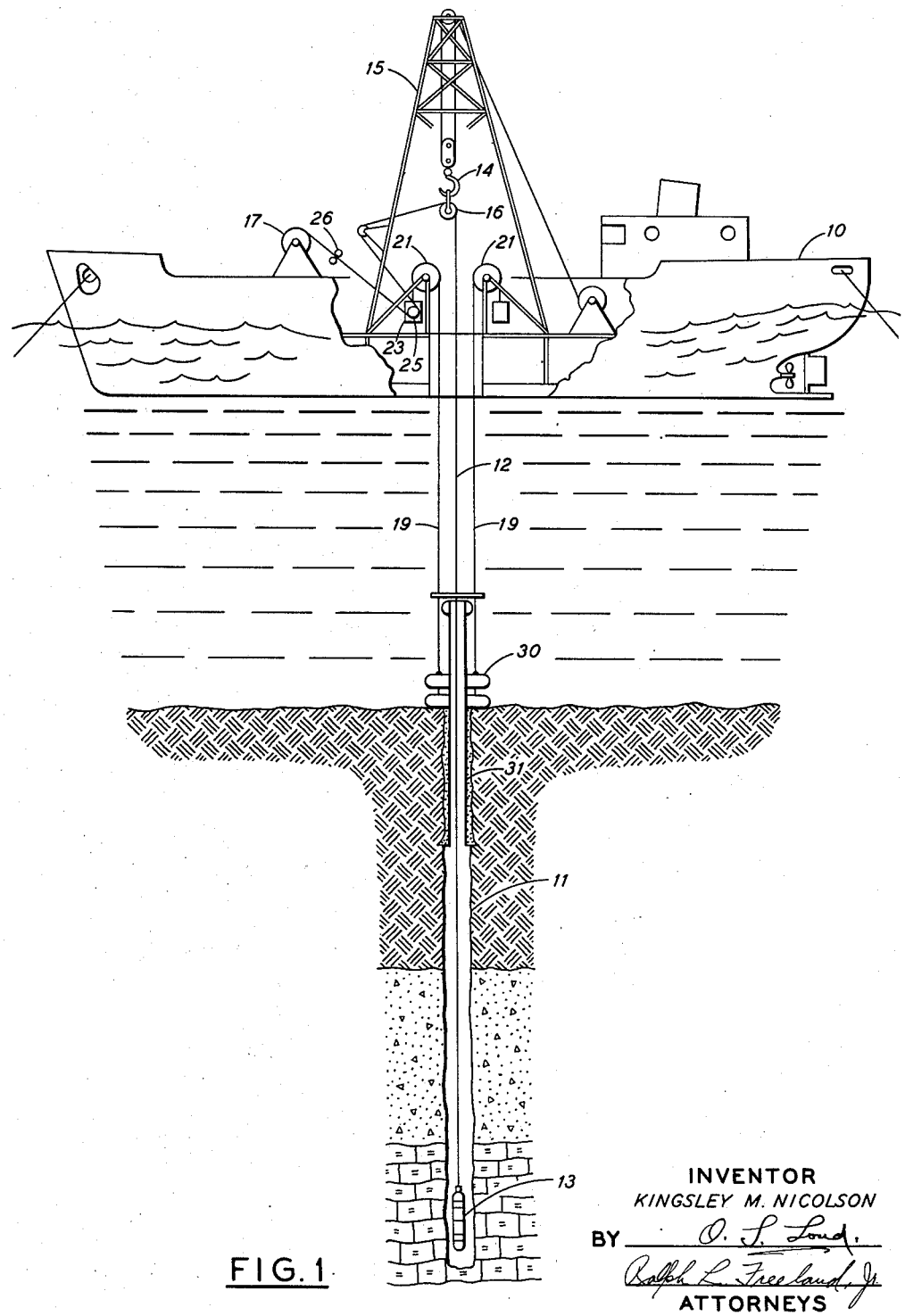
Fig. 1 is a side elevation, partially in section, of a floating well-drilling structure, such as that used for coring operations in the ocean, illustrating a preferred form of the present invention as applied to an electrical logging system.

Referring now to the drawings, and in particular to Fig. 1, there is illustrated a coring vessel 10 through which bore hole 11 has been drilled into the underwater bottom while the vessel is moored in an open sea.

As shown, the vertical movement of ship 10, due to its freely floating condition, results in logging cable 12 and logging sonde 13 attached thereto vertically rising and falling while sonde 13 traverses well bore 11. Such movement results from cable 12 being directly supported by pulley 16 which hangs on hook and traveling block 14 in drill derrick 15. Thus, logging cable 12 rises and falls with pulley 16, and supply drum 17, but the depth measurement of said drum, as detected by the rotation of rolls 26 will be only an average value of the true depth of sonde 13.

In accordance with the present invention, true depth of the sonde, during such vertical motion of cable 12 and sonde 13, induced by the heaving of ship 10, is indicated by compensating the record in response to a depth-sensing means. As shown in Fig. 1, the depth-sensing means comprises a ground-engaging cable 19, passing over a fixed pulley 21, with the opposite end of cable 19 terminating in a movable weight member 23 of sufficient mass to assure that substantially a constant tension is maintained in cable 19.

Further in accordance with this embodiment of the invention, weight member 23 of said depth-sensing means moves up and down relative to bottom an amount double the vertical distance moved by the ship. However, weight member 23 will move relative to the ship and its supporting pulley 21 only a distance equal to the change in elevation of ship 10 relative to bottom. Accordingly, weight 23 is used in the arrangement of Fig. 1 as a pulley-supporting member through which logging cable 12 passes when run from drum 17 over the main supporting pulley 16. This relationship is schematically illustrated by the line diagram of Fig. 2. It will be noted that as the floating platform, representing ship 10, rises in the water under wave thrust, the fixed end of cable 19 elongates and pulley 21 rotates in a clockwise direction. This action lifts weight 23 and raises pulley 25. Lifting of pulley 25, in turn, slackens the free end of logging cable 12 to lower the logging cable in the well bore. Such elongation of cable 12 will be exactly equal to the distance the ship or floating structure has risen in the water. Thus logging cable 12 and the measuring electrodes supported on sonde 13 are maintained in the well bore at a position measurable by the released amount of cable passing over the measuring rolls 26.

As particularly shown in Fig. 1, the ground-engaging cables 19 of the present embodiment may be utilized as guides for the setting of the blowout preventers 30 and the casing 31. Since casing 31 is cemented in the underwater bottom, cables 19 are anchored to the underwater bottom so they may be used as depth-measuring lines.

It will be observed that the pulleys 21 will rotate, where no slippage occurs between them and cables 19, an amount directly proportional to the vertical rise or fall of the ship in the water. Thus, the rotational movement of measuring pulley 21 may be utilized to compensate the indicated depth of the logging sonde. In the arrangement of Fig. 3, this vertical motion is converted by pulley 21 into a compensating rotational motion through a differential drive mechanism, designated generally as 35. In this system, pulley 21 rotates in a clockwise direction upon rise of the floating structure in the water. A compensating downward adjustment of the logging cable is made by counterclockwise rotation of pulley 36 through differential gear 37. Thus, the length of logging cable and the position of the logging sonde is at all times maintained substantially fixed relative to the depth in the borehole, independently of the amount of rise or fall of the supporting platform.

A further embodiment of the invention, utilizing rotation of a pulley system for measuring vertical movement of the floating platform, is shown in Fig. 4. As there indicated, pulley 21 drives a reduction gear system identified as 40 to vary the indicated elevation of the logging cable and sonde. In this arrangement a differential gear 41 in paper drive mechanism 43 is adjusted through reduction gearing 40. As there shown, the position of cable 12 and hence the vertical location of logging sonde 13 is normally indicated by measuring rolls 26 rotating sprocket gear 45 on the paper drive mechanism of recorder 47. Differential gear 41, normally adjusted by handwheel 48, positions record paper 49 to correspond with the exact length of cable expended from drum 17. This exact length of cable may be measured by magnetic elements or slugs placed in the sheath of logging cable 12, so that their passage may be detected by changes in a magnetic circuit through the cable. As indicated generally by the solenoid 50 and counter 51, the exact length of cable payed out from the drum may be manually adjusted by the operator's turning handwheel 48 to position the record paper 49. Such an arrangement permits some slippage between roller 26 and cable 12 to be compensated with accuracy.

In accordance with the present invention, differential gear 41 is automatically rotated in response to the elevation of the structure above the underwater bottom. Thus rotation of pulley 21 turns reduction gear 40, and differential gear 41, to move recording paper 49 up and down an amount corresponding to the vertical motion of the supporting platform. As indicated schematically, paper roll 53 may be suitably biased by tension spring 54 to reverse the rotation, that is, rewind the paper, when the logging sonde goes down in the well, as the ship falls in the water. Since the electrical measurements are directly dependent upon the resistivity or other physical characteristics of the bore hole, said readings are substantially reproducible. Thus, the measured values indicated by galvanometers 57 will record directly the proper measurement for the indicated depth.

In the foregoing detailed description it will be seen that there is provided an apparatus for maintaining the indicated position of a well logging sonde and its accompanying electrodes or other detecting means at a position in the well bore corresponding to the indicated or measured depth. Said indicated depth is compensated in the record by direct variation of the depth measurements in accordance with the exact depth of the floating structure above the underwater bottom.

While various modifications and changes in the several forms of the present invention, illustrated and described hereinabove, will occur to those skilled in the art without departure from the invention, all such modifications and changes falling within the scope of the appended claims are intended to be included therein.

We claim:

1. Apparatus for continuously indicating the depth of well logging apparatus in a bore hole while supported from an unstable platform comprising logging cable means for traversing a detecting unit through the bore hole, cable supply drum means mounted on said unstable platform, pulley means mounted on said platform and supporting said cable means in the well bore, vertical motion compensating means operable in response to vertical movement of said platform, said compensating means comprising a cable means having one end thereof fixed relative to the earth and supported at its other end on pulley means mounted on said platform and which may rotate as the platform rises and falls, and means operable by rotation of the latter said pulley means to adjust the indicated depth of said logging cable in a direction and to an extent required to compensate for movement of the platform.

2. Apparatus for continuously indicating the depth of well logging apparatus in a bore hole while supported from an unstable platform comprising logging cable means for traversing a detecting unit through the bore hole, and cable supply drum means mounted on said unstable platform, pulley means mounted on said platform for supporting said cable means in the well bore, vertical motion compensating means intermediate said cable supply drum and the portion of said cable passing over said pulley means into the bore hole, said vertical motion compensating means being operable in response to vertical movement of said platform and comprising cable means having one end thereof fixed relative to the earth and supported at its other end by pulley means mounted on said platform and which may rotate as the platform rises and falls, and means operable by rotation of the latter said pulley means to adjust the indicated depth of said logging cable in a direction and to an extent required to compensate for movement of the platform.

3. Apparatus for maintaining a well logging apparatus substantially stationary in a bore hole while supported from an unstable platform comprising logging cable means for traversing a sonde through the bore hole, a cable supply drum mounted on said unstable platform, pulley means mounted on said platform for supporting said cable means in the well bore, vertical motion compensating means intermediate said cable supply drum and the portion of said logging cable passing into the bore hole, said compensating means being operable in response to vertical movement of said platform and comprising cable means having one end thereof fixed relative to the earth, pulley means mounted on said platform and supporting the fixed cable means adjacent its other end, means to maintain a substantially constant stress in said fixed cable means as the platform rises and falls, and additional pulley means operable by relative motion between the said other end of said fixed cable means and said platform to move the logging cable in a direction and to an extent required to hold said sonde substantially stationary with respect to the platform.

4. Apparatus for logging a bore hole drilled from a floating platform comprising a logging sonde supported on a logging cable and adapted to be positioned in the bore hole, pulley means for suspending the unsupported end of said logging cable and the sonde in the bore hole, a cable supply drum, means for measuring the length of cable unwound from said drum to indicate the depth of said sonde in said bore hole, and means for compensating the indicated depth of said sonde for changes in the true vertical depth when said floating platform rises and falls in the water under wave action, said compensating means including a cable having one end thereof fixed relative to the earth and supported adjacent its other end by a pulley mounted on said floating platform, the latter said cable being maintained taut by loading means connected to the said other end thereof, means responsive to the relative motion between the loaded end of the latter said cable and said platform for varying the length of the logging cable between said supply drum and the portion of said logging cable passing into the bore hole to maintain the length of logging cable within said bore hole and the position of the logging sonde substantially fixed relative to the earth while said floating platform rises and falls in the water.

5. Apparatus for logging a bore hole drilled from a floating platform comprising a logging sonde supported on a logging cable adapted to traverse said bore hole, pulley means for suspending the unsupported end of said logging cable and the sonde in the bore hole, cable supply means, means for indicating the length of cable released from said supply means, and means for compensating the indicated length of said cable when said floating platform rises and falls in the water under wave action, said compensating means including a cable having one end thereof fixed relative to the earth and supported adjacent its other end on a pulley means supported by said floating platform, the latter said cable being maintained taut by loading means engaging the said other end thereof, and means responsive to the relative motion between the latter said cable and said platform for maintaining the indicated length of the logging cable in said bore hole and the actual length of logging cable and the position of the logging sonde in said bore hole in substantially a fixed relationship while said floating platform rises and falls in the water.

6. Apparatus in accordance with claim 5 in which said relative motion responsive means includes additional pulley means engaging said logging cable intermediate said cable supply means and the unsupported end of said logging cable and means for actuating said additional pulley means to vary the length of logging cable passing over the suspending pulley means into said well bore.

7. Apparatus in accordance with claim 6 in which said additional pulley means is vertically displaced in accordance with a movement of said loading means to vary the logging cable length in an amount compensatory to said platform's movement.

8. Apparatus in accordance with claim 6 in which said additional pulley means includes gear means for rotating said additional pulley means in an amount opposite and equal to the movement between said cable having one end thereof fixed relative to the earth and said platform to vary the logging cable length in an amount compensatory to said platform's movement.

No references cited.